US007631169B2

(12) United States Patent
Darrington et al.

(10) Patent No.: US 7,631,169 B2
(45) Date of Patent: Dec. 8, 2009

(54) FAULT RECOVERY ON A MASSIVELY PARALLEL COMPUTER SYSTEM TO HANDLE NODE FAILURES WITHOUT ENDING AN EXECUTING JOB

(75) Inventors: David L. Darrington, Rochester, MN (US); Patrick Joseph McCarthy, Rochester, MN (US); Amanda Peters, Rochester, MN (US); Albert Sidelnik, St. Paul, MN (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 11/670,803

(22) Filed: Feb. 2, 2007

(65) Prior Publication Data

US 2008/0189573 A1   Aug. 7, 2008

(51) Int. Cl.
*G06F 11/07* (2006.01)
(52) U.S. Cl. ..................................... 712/220
(58) Field of Classification Search .................. 712/220
See application file for complete search history.

(56) References Cited

U.S. PATENT DOCUMENTS

| | | | | |
|---|---|---|---|---|
| 5,513,319 | A * | 4/1996 | Finch et al. ................... | 714/55 |
| 6,134,655 | A * | 10/2000 | Davis ........................... | 713/1 |
| 6,530,047 | B1 * | 3/2003 | Edwards et al. ............. | 714/724 |
| 6,629,257 | B1 * | 9/2003 | Hartwell ..................... | 713/502 |
| 6,711,700 | B2 | 3/2004 | Armstrong et al. | |
| 7,191,372 | B1 * | 3/2007 | Jacobson et al. ............. | 714/724 |
| 7,421,478 | B1 * | 9/2008 | Muchow ..................... | 709/209 |
| 2002/0065646 | A1 * | 5/2002 | Waldie et al. ................ | 703/26 |
| 2004/0034816 | A1 * | 2/2004 | Richard ....................... | 714/39 |
| 2004/0088523 | A1 * | 5/2004 | Kessler et al. ................ | 712/29 |
| 2004/0103218 | A1 * | 5/2004 | Blumrich et al. ............ | 709/249 |
| 2006/0143446 | A1 * | 6/2006 | Frank et al. .................. | 713/164 |
| 2006/0221841 | A1 * | 10/2006 | Lee et al. ..................... | 370/242 |
| 2006/0236150 | A1 * | 10/2006 | Lintz et al. .................... | 714/6 |

FOREIGN PATENT DOCUMENTS

EP     1391822 A2    2/2004

OTHER PUBLICATIONS

Archer et al, U.S. Appl. No. 11/539,248, filed Oct. 6, 2006, "Method and Apparatus for Routing Data in an Inter-Nodal Communications Lattice of a Massively Parallel Computer System by Dynamic Global Mapping of Contended Links".

(Continued)

*Primary Examiner*—Eric Coleman
(74) *Attorney, Agent, or Firm*—Martin & Associates, LLC; Derek P. Martin

(57) ABSTRACT

A method and apparatus for fault recovery of on a parallel computer system from a soft failure without ending an executing job on a partition of nodes. In preferred embodiments a failed hardware recovery mechanism on a service node uses a heartbeat monitor to determine when a node failure occurs. Where possible, the failed node is reset and re-loaded with software without ending the software job being executed by the partition containing the failed node.

19 Claims, 4 Drawing Sheets

OTHER PUBLICATIONS

Archer et al, U.S. Appl. No. 11/539,270, filed Oct. 6, 2006, "Method and Apparatus for Routing Data in an Inter-Nodal Communications Lattice of a Massively Parallel Computer System by Semi-Randomly Varying Routing Policies for Different Packets".

Archer et al, U.S. Appl. No. 11/539,300, filed Oct. 6, 2006, "Method and Apparatus for Routing Data in an Inter-Nodal Communications Lattice of a Massively Parallel Computer System by Routing Through Transporter Nodes".

Archer et al, U.S. Appl. No. 11/539,329, filed Oct. 6, 2006, "Method and Apparatus for Routing Data in an Inter-Nodal Communications Lattice of a Massively Parallel Computer System by Dynamically Adjusting Local Routing Strategies".

Gara, A. et al, "Overview of the Blue Gene/L System Architecture", IBM Journal of Research and Development, International Business Machines Corporation, New York, NY, USA, vol. 49, No. 2-3, Mar. 1, 2005, pp. 195-212, X002469210.

Haring, R. A. et al, "Blue Gene/L Computer Chip: Control, test, and bring-up infrastructure", IBM Journal of Research and Development, International Business Machines Corporation, New York, NY, USA, vol. 49, No. 2-3, May 1, 2005, pp. 289-301, XP002492140.

* cited by examiner

FAULT RECOVERY ON A MASSIVELY PARALLEL COMPUTER SYSTEM TO HANDLE NODE FAILURES WITHOUT ENDING AN EXECUTING JOB

BACKGROUND OF THE INVENTION

1. Technical Field

This invention generally relates to fault recovery on a parallel computing system, and more specifically relates to fault recovery on a massively parallel super computer to handle node failures without ending an executing job.

2. Background Art

Supercomputers continue to be developed to tackle sophisticated computing jobs. These computers are particularly useful to scientists for high performance computing (HPC) applications including life sciences, financial modeling, hydrodynamics, quantum chemistry, molecular dynamics, astronomy and space research and climate modeling. Supercomputer developers have focused on massively parallel computer structures to solve this need for increasingly complex computing needs.

One such massively parallel computer being developed by International Business Machines Corporation (IBM) is the Blue Gene system. The Blue Gene system is a scalable system in which the maximum number of compute nodes is 65,536. Each node consists of a single ASIC (application specific integrated circuit) and memory. Each node typically has 512 megabytes or 1 gigabyte of local memory. The full computer would be housed in 64 racks or cabinets that are closely arranged in a common location and interconnected together with several networks. Each of the racks has 32 node boards and each node board has 32 nodes with 2 processors for each node.

The Blue Gene supercomputer's 65,536 computational nodes and 1024 I/O processors are arranged into both a logical tree network and a logical 3 dimensional torus network. The logical tree network is a logical network on top of a collective network topology. Blue Gene can be described as a compute node core with an I/O node surface. Each I/O node handles the input and output function of 64 compute nodes. The I/O nodes have no local storage. The IO nodes are connected to the compute nodes through the logical tree network and also have functional wide area network capabilities through its built in gigabit ethernet network. The nodes can be allocated into multiple node partitions so that individual applications or jobs can be executed on a set of Blue Gene's nodes in a node partition.

Soft failures in a computer system are errors or faults that are not due to a recurring hardware failure or hard fault. A soft failure can be caused by random events such as alpha particles and noise. In most computer system, such soft failures are quite infrequent and can be dealt with in traditional ways. In a massively parallel computer system like Blue Gene, the problem of soft and hard failures is significantly increased due to the complexity of the system and the number of compute nodes in the system. Further, a failure in one node in the prior art can cause a whole partition of the computer system to become unusable or require a job executing on a partition to be aborted and restarted.

Since computer system downtime and restarting a job wastes valuable system resources, without a way to more effectively recover from system faults caused by soft failures, parallel computer systems will continue to suffer from inefficient utilization of hardware and unnecessary computer downtime.

DISCLOSURE OF INVENTION

According to the preferred embodiments, a method and apparatus is described for fault recovery from a single node failure on a parallel computer system from a soft failure without ending an executing job on a partition of nodes. In preferred embodiments a failed hardware recovery mechanism on a service node uses a heartbeat monitor to determine when a node failure occurs. Where possible, the failed node is reset and re-loaded with software without ending the software job being executed by the partition of nodes containing the failed node.

The disclosed embodiments are directed to the Blue Gene architecture but can be implemented on any parallel computer system with multiple processors arranged in a network structure. The preferred embodiments are particularly advantageous for massively parallel computer systems.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention relates to an apparatus and method for fault recovery on a node of a parallel computer system from a soft failure without ending an executing job on a partition of nodes that includes the failed node. The preferred embodiments will be described with respect to the Blue Gene/L massively parallel computer developed by International Business Machines Corporation (IBM).

Figure 1:
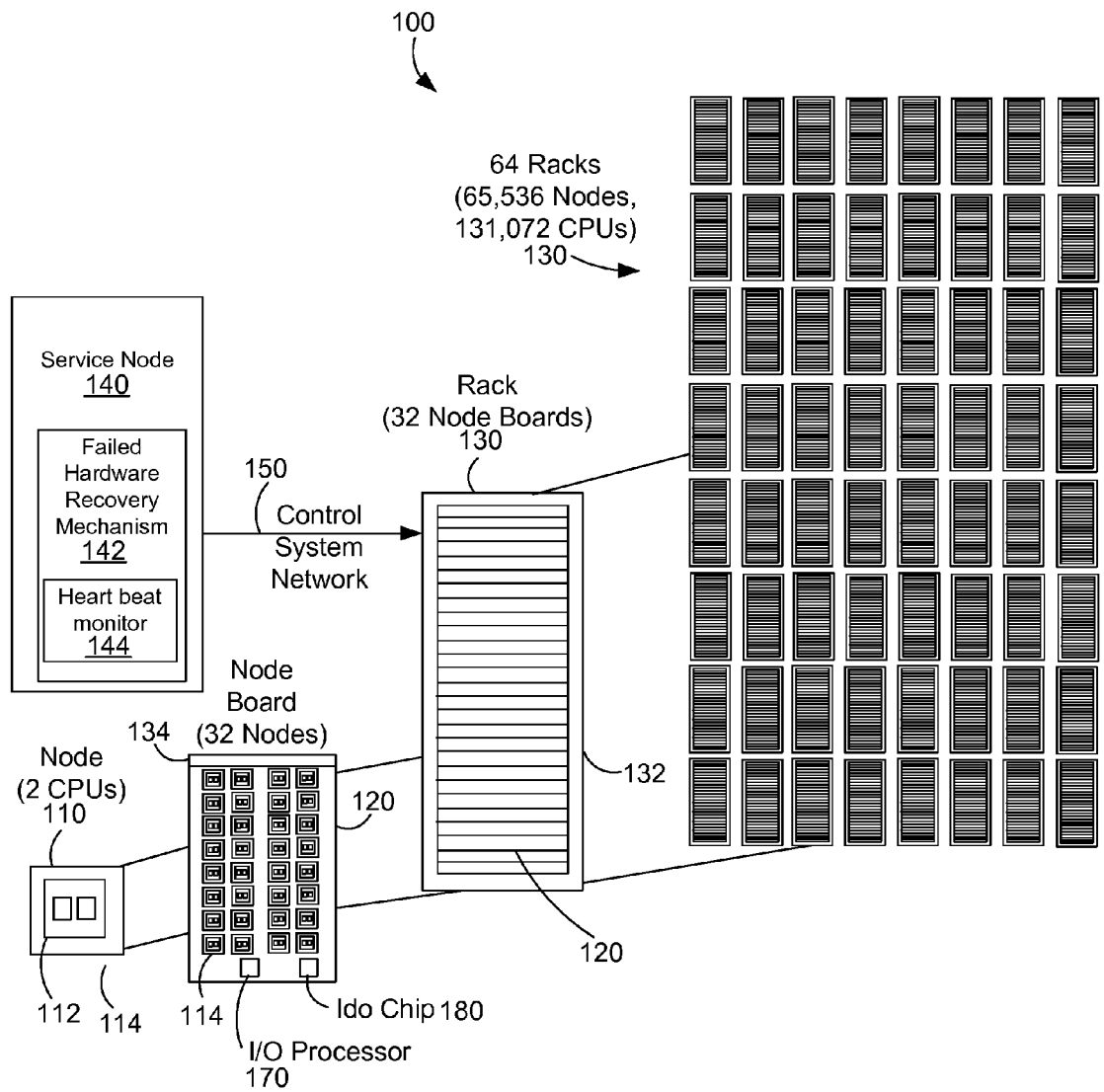
FIG. 1 is a block diagram of a massively parallel computer system according to preferred embodiments.

FIG. 1 shows a block diagram that represents a massively parallel computer system 100 such as the Blue Gene/L computer system. The Blue Gene/L system is a scalable system in which the maximum number of compute nodes is 65,536. Each node 110 has an application specific integrated circuit (ASIC) 112, also called a Blue Gene/L compute chip 112. The compute chip incorporates two processors or central processor units (CPUs) and is mounted on a node daughter card 114. The node also typically has 512 megabytes of local memory. A node board 120 accommodates 32 node daughter cards 114 each having a node 110. Thus, each node board has 32 nodes, with 2 processors for each node, and the associated memory for each processor. A rack 130 is a housing that contains 32 node boards 120. Each of the node boards 120 connect into a midplane printed circuit board 132 with a midplane connector 134. The midplane 132 is inside the rack and not shown in FIG. 1. The full Blue Gene/L computer system would be housed in 64 racks 130 or cabinets with 32 node boards 120 in each. The full system would then have 65,536 nodes and 131,072 CPUs (64 racks×32 node boards×32 nodes×2 CPUs).

The Blue Gene/L computer system structure can be described as a compute node core with an I/O node surface, where communication to 1024 compute nodes 110 is handled by each I/O node that has an I/O processor 170 connected to the service node 140. The I/O nodes have no local storage. The I/O nodes are connected to the compute nodes through the logical tree network and also have functional wide area network capabilities through a gigabit ethernet network (not shown). The gigabit Ethernet network is connected to an I/O processor (or Blue Gene/L link chip) 170 located on a node board 120 that handles communication from the service node 160 to a number of nodes. The Blue Gene/L system has one or more I/O processors 170 on an I/O board (not shown) connected to the node board 120. The I/O processors can be configured to communicate with 8, 32 or 64 nodes. The service node is uses the gigabit network to control connectivity by communicating to link cards on the compute nodes. The connections to the I/O nodes are similar to the connections to the compute node except the I/O nodes are not connected to the torus network.

Again referring to FIG. 1, the computer system 100 includes a service node 140 that handles the loading of the nodes with software and controls the operation of the whole system. The service node 140 is typically a mini computer system such as an IBM pSeries server running Linux with a control console (not shown). The service node 140 is connected to the racks 130 of compute nodes 110 with a control system network 150. The control system network provides control, test, and bring-up infrastructure for the Blue Gene/L system. The control system network 150 includes various network interfaces that provide the necessary communication for the massively parallel computer system. The network interfaces are described further below.

The service node 140 manages the control system network 150 dedicated to system management. The control system network 150 is a private 100-Mb/s Ethernet connected to an Ido chip 180 located on a node board 120 that handles communication from the service node 160 to a number of nodes. This network is sometime referred to as the JTAG network since it communicates using the JTAG protocol. All control, test, and bring-up of the compute nodes 110 on the node board 120 is governed through the JTAG port communicating with the service node. This network is described further below with reference to FIG. 2.

The Blue Gene/L supercomputer communicates over several additional communication networks. The 65,536 computational nodes are arranged into both a logical tree network and a physical 3-dimensional torus network. The logical tree network connects the computational nodes in a binary tree structure so that each node communicates with a parent and two children. The torus network logically connects the compute nodes in a three-dimensional lattice like structure that allows each compute node to communicate with its closest 6 neighbors in a section of the computer. Other communication networks connected to the node include a Barrier network. The barrier network uses the barrier communication system to implement software barriers for synchronization of similar processes on the compute nodes to move to a different phase of processing upon completion of some task. There is also a global interrupt connection to each of the nodes.

Again referring to FIG. 1, the service node 140 includes a failed hardware recovery mechanism 142. The failed hardware recovery mechanism comprises software (i.e., computer readable program code stored on computer readable recordable media) in the service node 140 that operates to recover from node faults according to preferred embodiments claimed herein. The failed hardware recovery mechanism uses a heartbeat monitor 144 to determine when a node fails. The heartbeat monitor reads and then clears a heartbeat flag that is placed in memory on the node as described further below. When the heart beat is no longer present, meaning the heart beat flag is not set, then the node has failed and the failed hardware recovery mechanism attempts to recover the node without ending any executing job on the node partition containing the failed node as described further below.

Figure 2:
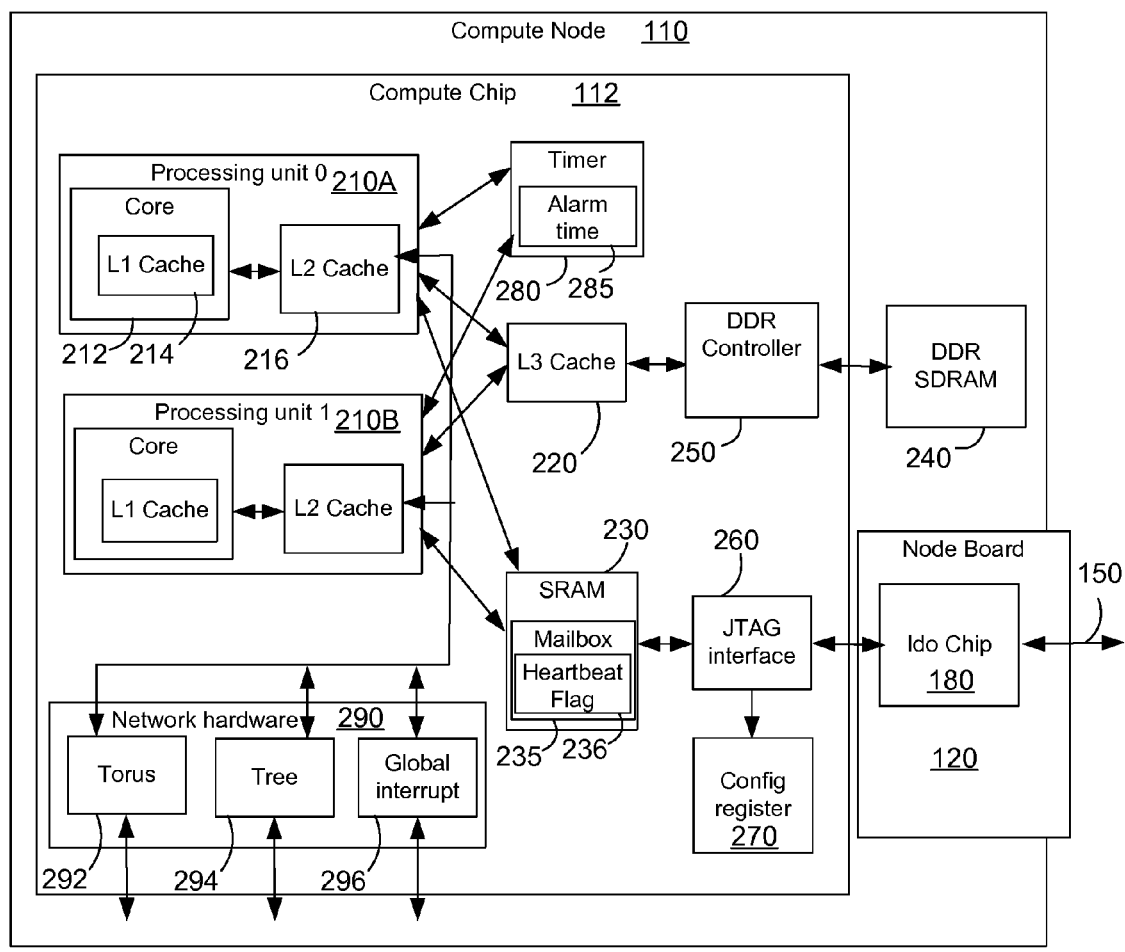
FIG. 2 is a block diagram of a compute node in a massively parallel computer system according to preferred embodiments.

FIG. 2 illustrates a block diagram of a compute node 110 in the Blue Gene/L computer system according to the prior art. The compute node 110 has a node compute chip 112 that has two processing units 210A, 210B. Each processing unit 210, has a processing core 212 with a level one memory cache (L1 cache) 214. The processing units 210 also each have a level two memory cache (L2 cache) 216. The processing units 210 are connected to a level three memory cache (L3 cache) 220, and to an SRAM memory bank 230. Data from the L3 cache 220 is loaded to a bank of DDR SDRAM 240 by means of a DDR controller 250.

Again referring to FIG. 2, the SRAM memory 230 is connected to a JTAG interface 260 that communicates off the compute chip 112 to an Ido chip 180. The service node communicates with the compute node through the Ido chip 180 over the an ethernet link that is part of the control system network 150 (described above with reference to FIG. 1). In the Blue Gene/L system there is one Ido chip per node board 120, and others on boards in each midplane 132 (FIG. 1). The Ido chips receive commands from the service node using raw UDP packets over a trusted private 100 Mbit/s Ethernet control network. The Ido chips support a variety of serial protocols for communication with the compute nodes. The JTAG protocol is used for reading and writing from the service node 140 (FIG. 1) to any address of the SRAMs 230 in the compute nodes 110 and is used for the system initialization and booting process. The JTAG interface 260 also communicates with a configuration register (Config register) 270 that holds reset bits for resetting various portions of the node compute chip 112 as described further below.

Again referring to FIG. 2, the compute node 110 further includes a timer 280 that has an alarm time 285 that can be set under software control. In preferred embodiments herein, the timer is used to create a heartbeat to inform the heart beat monitor 144 in the service node 140 (FIG. 1) that the node is operating properly. The node receives an alarm time 285 from the service node. The timer 280 is set to go off periodically with a period equal to the alarm time 285. When the timer detects the alarm time 285 has elapsed, and if the node is operating properly, a heart beat flag 236 is set in the mailbox 235 of the SRAM 230. The heart beat monitor 144 of the service node 140 checks for the presence of the heart beat 236 flag of all the nodes regularly and operated to recover a failed node if the heart beat flag is not present as described in more detail below.

The node compute chip 112, illustrated in FIG. 2, further includes network hardware 290. The network hardware 290 includes hardware for the Torus 292, Tree 294 and Global interrupt 296 networks. These networks of the Blue Gene/L are used for a compute node 110 to communicate with the other nodes in the system as described briefly above.

Figure 3:
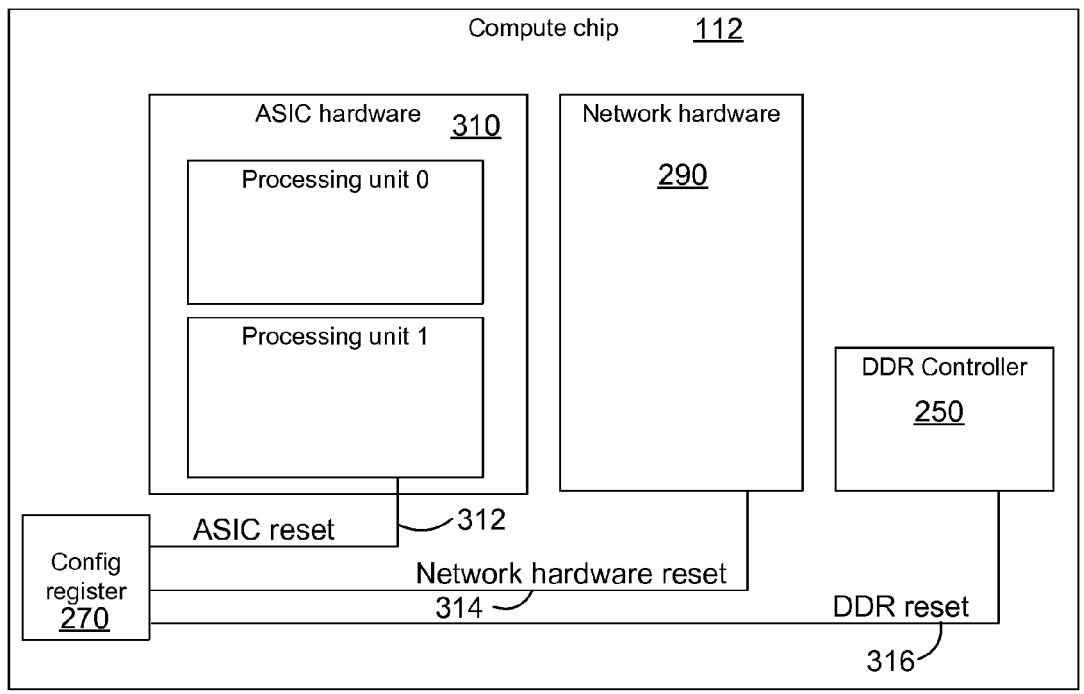
FIG. 3 illustrates a block diagram of the node reset hardware according to preferred embodiments.

FIG. 3 shows a block diagram that illustrates the reset capabilities of the compute chip 112. The compute chip 112 includes several separate resets that were designed to enhance the diagnostic capability of the compute chip 112. In preferred embodiments, these resets are used for fault recovery as described herein. For the purposes of reset, hardware on the compute chip can be generally divided into ASIC hardware 310, network hardware 290, and DDR controller 250. The ASIC hardware 310 is the remaining ASIC hardware not included as part of the network hardware 290 or the DDR controller 250. The config register 270 holds reset bits (not shown) for resetting the hardware as described above. The reset bits in the config register 270 drive reset outputs as shown in FIG. 3. The ASIC hardware 310 is reset by the ASIC hardware reset 312, the network hardware 720 is reset by the network hardware reset 314 and the DDR controller is reset by the DDR reset 316. The resets provide typical reset features to set the associated hardware to a know condition for initialization.

In preferred embodiments herein, the multiple resets on the compute chip 112 are used to recover from some soft faults without ending an executing application or job in a partition of the parallel computer system. The application software operating on the partition with the failing node may need to be suspended during recovery of the node, but if recovery is successful, the application can be continued without restarting after recovery of the node. In preferred embodiments, a timer is setup to provide a heart beat flag in the mailbox of each node at a pre-determined interval. The heart beat monitor in the service node monitors and resets the heart beat flag in each node to determine if a node failure occurs. If there is no heart beat on a node, the failed hardware recovery mechanism on the service node attempts to recover the node without resetting the network hardware so as not to disturb the other nodes in the system that are using the network hardware on the failing node. Resetting the network hardware would require restarting the application executing on the partition because it would interrupt the flow of information through the node between neighboring nodes in the torus and logical tree networks. Note that the fault recovery described herein is not for faults associated with the network hardware. Network hardware faults would cause multiple fails indicated by the interconnected nodes and would require other means not described herein.

After a detecting the lack of a heartbeat, if the failed hardware recovery mechanism can successfully load diagnostic code into SRAM and the DDR controller and memory are operable, then the DDR controller is reset and the operating software kernel is reloaded into the node. The node is then able to continue without resetting the entire ASIC. If the failed hardware recovery mechanism cannot successfully load diagnostic code into SRAM, then the ASIC reset is used to reset the ASIC except the network hardware, the DDR is reset and the operating software kernel is reloaded into the node. This procedure allows the minimal amount of the node to be reset to recover from the fault. The compute node can then resume operation and the remaining nodes in the partition can resume operation of the executing application without restarting the application from the beginning.

Figure 4:
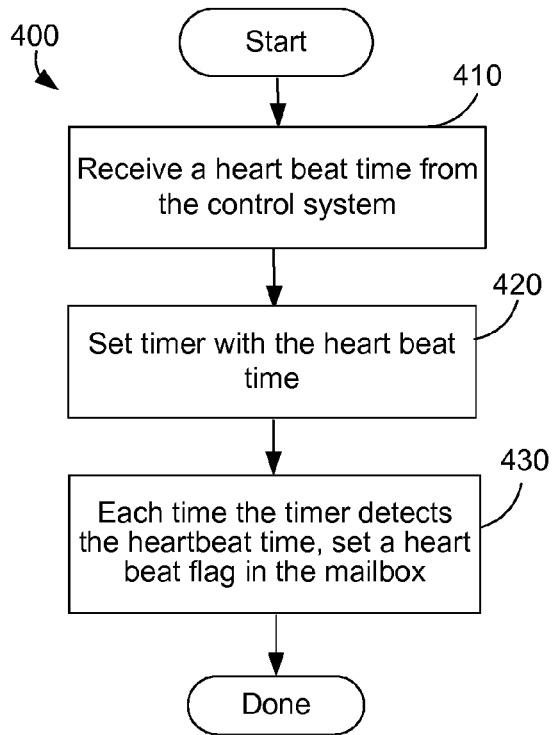
FIG. 4 is a method flow diagram for setting up a heart beat timer on the compute nodes of a massively parallel computer system according to preferred embodiments.

FIG. 4 illustrates a method 400 for setting up a heart beat on a compute node for fault recovery according to embodiments herein. The method is concerned with the actions performed on the compute node to provide a heart beat to the heart beat monitor in the service node, but the method could be initiated by the service node or otherwise part of the boot up process of the compute node. The compute node receives a heart beat time from the control system of the service node (step 410) and uses the heart beat time to set the timer (step 420). Each time the timer in the compute node detects a heart beat then a heart beat flag is set in the SRAM mailbox for the heart beat monitor to check for the compute nodes heart beat (step 430). This method is then done.

Figure 5:
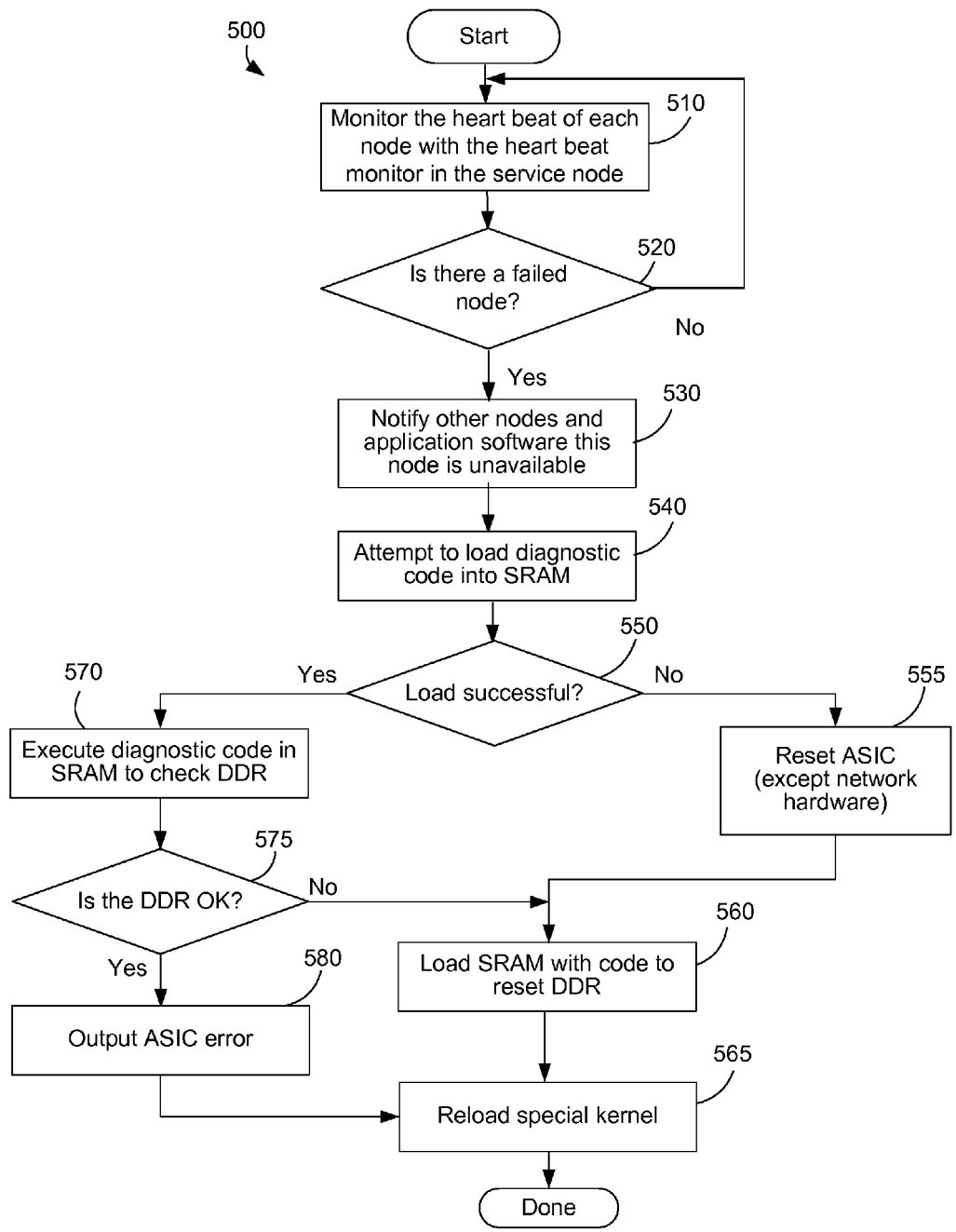
FIG. 5 is a method flow diagram for fault recovery of a failed node on a massively parallel computer system according to preferred embodiments.

FIG. 5 illustrates a method 500 for fault recovery on a parallel computer system according to embodiments herein. The actions described in this method are performed by the failed hardware recovery mechanism 142 and the heart beat monitor 144 as described above with reference to FIG. 1. The heart beat monitor monitors the heart beat of each node in the computer system (step 510) by checking the heart beat flag in each node as described above. If there is no failed node (step 520=no) then return to step 510 and continue monitoring. If there is a failed node as indicated by the lack of a heart beat flag (step 520=yes), then notify other nodes in the partition and the application software this node is unavailable (step 530). Then attempt to load diagnostic code into the SRAM of the failed node to check the operation of the node (step 540). If the load is not successful (step 550=no) then reset the ASIC except for the network hardware (step 555), load the SRAM with code to reset the DDR (step 560) and then reload the special system kernel for the node to continue processing (step 565). If the load is successful (step 550=yes) then execute the diagnostic to check the DDR (step 570). If the DDR is ok (step 575=yes) then output an ASIC error to the service node (step 580) and then reload the special system kernel for the node to continue processing (step 565). If the DDR is not ok (step 575=no) then load the SRAM with code to reset the DDR (step 560) and then reload the special system kernel for the node to continue processing (step 565). The method is then done.

As described above, embodiments provide a method and apparatus for fault recovery on a node of a parallel computer system from a soft failure without ending an executing job on a partition of nodes in a massively parallel super computer system. Embodiments herein allow the service node to reset non-network portions of a failing node so that other nodes in the partition are not affected to reduce system down time and increase efficiency of the computer system.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A parallel computer system comprising:
    a partition of the parallel computer system comprising a plurality of compute nodes, wherein each compute node comprises reset hardware to reset a network hardware portion of the compute node separate from reset hardware to reset a remaining portion of the compute node that comprises a processing unit;
    a service node for controlling the operation of the compute nodes over a network, the service node including a failed hardware recovery mechanism that detects a failed compute node;
    wherein the failed hardware recovery mechanism resets the remaining portion of the failed compute node without resetting the network hardware portion to recover from a fault on the failed compute node so that an application executing on the partition and sending data between the plurality of compute nodes over the network hardware portion can continue executing without restarting after the reset of the remaining portion.

2. The parallel computer system of claim 1 wherein the plurality of compute nodes further comprise a timer for setting a heart beat flag at predetermined intervals in a memory of the compute node to indicate the compute node is operating properly.

3. The parallel computer system of claim 2 wherein the failed hardware recovery mechanism further comprises a heart beat monitor to monitor the heart beat flag in the compute nodes to detect a failed compute node of the plurality of nodes by the lack of a set heart beat flag.

4. The parallel computer system of claim 3 wherein the fault on the failed compute node is detected by the heart beat monitor.

5. The parallel computer system of claim 3 wherein the heart beat flag is stored in static memory on the compute node and the failed hardware recovery mechanism reads the static memory over an ethernet network that accesses the static memory through a JTAG interface on the compute node.

6. The parallel computer system of claim 5 wherein the parallel computer system is a massively parallel computer system with a large number of compute nodes housed in a number of closely arranged computer racks.

7. The parallel computer system of claim 1 wherein the remaining portion of the compute node is a DDR memory controller of an ASIC processor chip.

8. The parallel computer system of claim 1 wherein the parallel computer system is a massively parallel computer system with a large number of compute nodes housed in a number of closely arranged computer racks.

9. A computer implemented method for operating a parallel computer system having a plurality of compute nodes connected to a service node by a control system network, the method comprising the steps of:
   a) each node providing a heart beat;
   b) monitoring the heart beat of each compute node in the service node of the computer system;
   c) attempting to recover from a fault in a failed compute node indicated by a lack of a heart beat in the failed compute node without aborting an application running on a partition of nodes containing the failed compute node with the fault by performing the steps of:
   c1) attempting to load diagnostic code into the compute node; and
   c2) if the load is not successful then resetting a portion of the compute node, including all sections of the compute node except a network hardware section, resetting a memory controller in the compute node and loading a system kernel in the compute node.

10. The computer implemented method of claim 9 wherein the step of monitoring the compute node comprises the steps of:
   d) the compute node receiving a heart beat time from the service node;
   e) setting a timer with the heart beat time; and
   f) detecting the elapsed heart beat time of the timer and setting a heart beat flag in a memory of the compute node.

11. The computer implemented method of claim 9 further comprising the steps of:
   g) if the load is successful then executing the diagnostic code to check a memory controller for proper operation; and
   h) if the memory controller is operating properly, then loading code in the compute node to reset the memory controller, resetting the memory controller and loading the compute node with a system kernel.

12. The computer implemented method of claim 11 wherein memory controller is a DDR memory controller of an ASIC processor chip.

13. The computer implemented method of claim 9 wherein the computer system is a massively parallel computer system housed in a number of closely arranged computer racks.

14. A computer-readable program product comprising:
   a failed hardware recovery mechanism comprising computer readable program code that when executed monitors a plurality of compute nodes that comprise a partition in the parallel computer system to determine if a compute node fails, and wherein the failed hardware recovery mechanism resets a remaining portion of a failed compute node without resetting a network hardware portion of the compute node to recover from a fault on the failed compute node so that an application executing on the partition and sending data between the plurality of compute nodes over the network hardware portion can continue executing without restarting after the reset of the remaining portion; and
   computer readable recordable media bearing the failed hardware recovery mechanism.

15. The program product of claim 14 wherein the plurality of compute nodes further comprise a timer for setting a heart beat flag at predetermined intervals in a memory of the compute node to indicate the compute node is operating properly.

16. The program product of claim 15 wherein the failed hardware recovery mechanism further comprises a heart beat monitor to monitor a heart beat in the compute nodes to detect a failed compute node of the plurality of nodes by the lack of the set heart beat flag.

17. The program product of claim 16 wherein the heart beat flag is stored in static memory on the compute node and the service node reads the static memory over a ethernet network that accesses the static memory through a JTAG interface on the compute node.

18. The program product of claim 17 wherein the parallel computer system is a massively parallel computer system with a large number of compute nodes housed in a number of closely arranged computer racks.

19. The program product of claim 14 wherein the parallel computer system is a massively parallel computer system with a large number of compute nodes housed in a number of closely arranged computer racks.

* * * * *